United States Patent [19]

Szabó

[11] Patent Number: 5,864,125

[45] Date of Patent: Jan. 26, 1999

[54] NAVIGATION SYSTEM DATA ENTRY CARD HAVING IMPRINTED PICTORIAL AND BAR CODE NAVIGATION INFORMATION

[76] Inventor: LászlóSzabó, Károly u. 111, H-1201 Budapest, Hungary

[21] Appl. No.: 765,404

[22] PCT Filed: Jul. 6, 1995

[86] PCT No.: PCT/HU95/00034

§ 371 Date: Jan. 8, 1997

§ 102(e) Date: Jan. 8, 1997

[87] PCT Pub. No.: WO96/02005

PCT Pub. Date: Jan. 25, 1996

[30] Foreign Application Priority Data

Jul. 8, 1994 [HU] Hungary .............................. P 9402043

[51] Int. Cl.⁶ .................................................. G06K 19/00
[52] U.S. Cl. .............................. 235/384; 235/487; 283/34
[58] Field of Search ..................... 235/487, 488, 235/494, 384; 283/23, 34, 108

[56] References Cited

U.S. PATENT DOCUMENTS

| | | | |
|---|---|---|---|
| 4,034,210 | 7/1977 | Hill et al. | 235/487 |
| 4,105,156 | 8/1978 | Dethloff | 235/487 |
| 4,540,880 | 9/1985 | Hipko | 235/487 |
| 4,668,858 | 5/1987 | Heuwieser et al. | 235/472 |
| 4,904,853 | 2/1990 | Yokokawa | 235/487 |
| 5,270,936 | 12/1993 | Fukushima et al. | 701/213 |
| 5,329,108 | 7/1994 | Lamoure | 235/472 |
| 5,406,491 | 4/1995 | Lima | 701/210 |
| 5,408,076 | 4/1995 | Griffanti | 235/487 |
| 5,498,860 | 3/1996 | Ohno et al. | 235/384 |
| 5,696,684 | 12/1997 | Ueberschaer | 364/443 |

FOREIGN PATENT DOCUMENTS

| | | |
|---|---|---|
| 43 39 059 A1 | 5/1994 | Germany . |
| 2 120 387 | 11/1983 | United Kingdom . |
| WO 92/08952 | 5/1992 | WIPO . |

OTHER PUBLICATIONS

Form PCT/ISA/210 for PCT/HU955/00034.

*Primary Examiner*—Anita Pellman Gross
*Assistant Examiner*—Drew A. Dunn
*Attorney, Agent, or Firm*—Finnegan, Henderson, Farabow, Garrett, & Dunner, L.L.P.

[57] ABSTRACT

Universal data input card which loads the data of a destination point and the route into the navigation device. The card can be produced completely by printing and can be published in any printed product. On the card is a picture field (3) to locate a photo and text field (4) for locating text information, miniature map segments (2) which contain the route information and a bar-code (1) which provides the coordinates of the destination points. The card of the selected destination point is simply inserted into a card input slot (7) of a GPS device which is built together with an optoelectronic card reader. The device then navigates the driver to the destination point by means of the information shown on a display (6) which can be accompanied by additional voice information. The purpose of introducing the system which operates with a printed card is to spread GPS technology into everyday use for the public.

11 Claims, 4 Drawing Sheets

NAVIGATION SYSTEM DATA ENTRY CARD HAVING IMPRINTED PICTORIAL AND BAR CODE NAVIGATION INFORMATION

BACKGROUND OF THE INVENTION

The subject of the invention is a universal data input card for navigation systems, produced entirely by printing method on inexpensive materials, and a GPS device equipped with data input card reading capability. Data and information needed for navigation are recorded on the surface of the card in a form which can be read by the naked eye and by electro-optical readers. By inserting a universal data input card into the GPS device capable of reading the information on the card, the device can navigate to a destination point determined by the card.

The invention is related to Global Positioning System (GPS) that provides location identification across the entire globe. The invention will function with any other navigation system in which destination data and routes need to be entered into the navigation device in a simple, straightforward manner.

The Global Positioning Sytem is a satellite based navigation system. The 24 navigation satellites of the system enable to determine with great accuracy geographical coordinates anywhere on the world. The satellites orbit at an altitude of 20,000 km and circle the earth twice daily.

In the recent years, the GPS satellite navigation system has been employed for aviation and marine purposes. Small, portable GPS devices appear on the market, that are very accurate and have a range of useful functions. The devices display the geographical coordinates of the current position and also the correct direction when traveling toward a specific destination point. The devices also display the distance to destination, current speed, the estimated time of arrival etc. The devices may also be used for overland travel, however, their use in this area is not yet widespread.

The expansion of GPS technology has been held back because until now there has been no simple device which was inexpensive, mass-producible, involving the largest target group, that is, drivers, motorcyclists, even cyclists into the group of users.

Ongoing advancements in GPS technology aim at expanding present GPS applications in practical ways for everyday use. As a typical example, GPS devices appear in automobiles, being capable of displaying maps, loading navigation data from CD-ROM devices. However, this technology is expensive and is limited to specific geographic regions the data of which have been recorded on CD-ROM.

Usual GPS devices require some technical and navigation knowledge so the applications is complicated for the average user. The method of entering navigation data to the GPS device account for the complication.

In case of the most widely used GPS devices navigation data are entered via numeric keypad. In this method the user must enter character by character the coordinates of the desired destination point and the way point coordinates. This task is difficult and time consuming. However, navigation data can also be entered through a standard medium which is generally removable, containing a varying amount of data.

There is a known procedure which uses removable memory cards to enter destination data into the navigation equipment. Such device is described in U.S. Pat. No. 5,270,936. In case of this solution the removable memory card takes over the internal memory functions. The memory card is read electronically, just like internal memories. The described device is relatively inexpensive and simple to use. However, the described medium is expensive, cannot be mass produced, and is only capable of storing a limited amount of data, therefore the described equipment can only display the distance, direction and name of the destination point. These drawbacks will limit the usage of the described simplified navigation apparatus.

There is a known procedure which uses printed materials in the navigation device such as the one described in U.S. Pat. No. 4,668,858. This system uses the earth's magnetic field for "dead reckoning" navigation, where bar-codes printed over a traditional map are used to determine starting and destination points. The drawback of this device and method is that they are limited to a specialized purpose and are unsuitable for broader application.

Generally we can say that current GPS technology is not suitable to satisfy a really widespread consumer demand due to a lack of proper devices and procedures.

SUMMARY OF THE INVENTION

The objective of the invention is to attract the possible broadest user population for utilizing the GPS system. The largest population of potential users is certainly the drivers of automobiles and other land-bound vehicles. The majority of this large group is not experienced in navigation, so it is necessary to simplify the application of GPS technology in order to increase the number of these users.

This invention is based on the understanding that the only way of simplifying the GPS system is to use a particularly simple method of loading navigation data into a GPS device by means of inexpensive, mass-producible media. Setting out from the hypothesis that GPS technology will mainly be used for tourist and hobby purposes, I realized that navigation data input cards need to be easily producible and marketable all over the world. I understand that the GPS device can only be simplified when it contains minimal controls and provides information required for orientation in a simple and straightforward manner.

On one hand, the solution is the universal data input card that contains navigation data and/or information on a predetermined destination point. The essence of the invention is that the data and/or information are recorded on the surface of the card as surface visual information in a form totally readable with the naked eye and/or by electro-optical methods. The card is preferably made of paper and information are printed on the surface of the card. The geographical coordinates in bar-code form, miniature map segments, a picture of the destination, a short description of the destination point, and other useful data and information, are printed in an arranged typographical format on the surface of the card. As part of a printed product the cards can be easily removed from the publication along contour lines or perforation. Secondary destination points are indicated in different colors and/or signs on the map segments.

The other component of the invention is a GPS device capable of reading the universal data input card. The device consists of a central processing unit (CPU), a satellite receiver unit and a data input unit connected to the CPU input, and a display unit connected to the CPU output. The essence of the GPS device according to the invention is that the data input unit is an electro-optical reader which converts surface recorded visual information into electrical signals. In the simple, advantageous form of the equipment the data input unit is a bar-code reader which can only be used for simple navigation mission. In its more advanced form the data input unit consist of an electro-optical scanner unit that can read all information from the map segments recorded on the card, therefore assuring comfortable navigation along the route. The scanner can read any data and information from the card, so the unit can display the photograph on the visual display and the voice synthesizer can announce the text information, if necessary. The equipment has a visual display, with alphanumeric and graphic capability. The display unit can be equipped with an optional speech synthesizer—sound signaling unit.

BRIEF DESCRIPTION OF THE DRAWINGS

The preferred embodiment of the present invention will now be described in detail be referred to the accompanying figures.

DETAILED DESCRIPTION OF THE PREFERRED EMBODIMENTS

Figure 1:
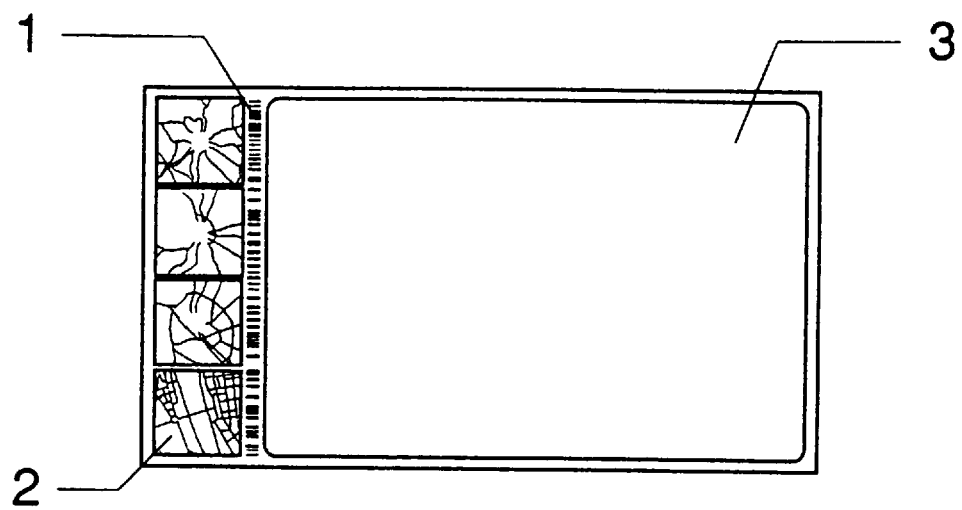
FIG. 1. top surface of the card
Figure 2:
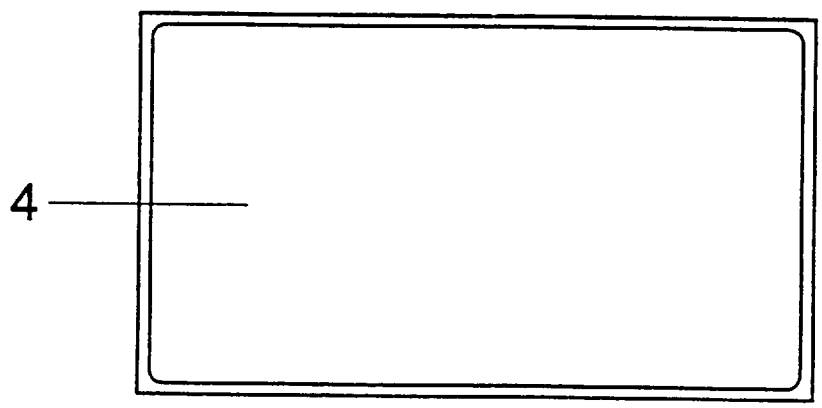
FIG. 2. bottom surface of the card

The preferred embodiment of the data input card is illustrated in FIGS. 1 and 2. The card measures 50×90 mm (2"×3.5"), just like a standard business card. The card is preferably made of cardboard or plastic. It can be coated with a transparent protective foil or lacquer layer if necessary. In landscape position, the left side of the card contains the map segments 2 of the area of the destination point and the bar-code 1 representing the coordinates of the destination point. The orientation of the map segments 2 is North, which means that their upper edge point toward the North. The coordinates of the destination point are also printed in alphanumeric form on the card, so they can be used in traditional GPS systems, too. The position of the destination point is given in geographical coordinates conforming to the WGS-84 (Word Geodetic System). The format of the coordinates is Y DD°MM.MM' X DDD°MM.MM'. In the picture field 3, to the right of the bar-code 1 there is a photograph showing a landmark or building on the destination. This solution is favorable for cards made for tourism. The aspect ratio of the picture field 3 is approximately 1:1.5 as in 36 mm negative frames. The other side of the card contains a short description of landmarks, historical buildings and other information in the text field 4. In the picture field 3 and text field 4 of the card optional information can be shown, for example usual business card data or advertisement, depending on the purpose of the card.

The map segments 2 located on the card have an effective area of one square centimeter. The printed size of the map segments 2 is slightly larger (about 15%) because of the overlapping needed. The scale ratio of the adjacent map segments 2 is 1:5. The scale of the map segments 2 on the example is 1:100,000, 1:500,000, 1:2,500,000, and 1:12,500,000. The four map segments 2 cover areas of 1×1 km, 5×5 km, 25×25 km, 125×125 km. Even in the case of lower printing quality, the 1×1 km area including a map segment 2 exceeds the resolution of the GPS system. Where a printed line is 0.2 mm thick, the resolution of the device falls into a 20 meter accuracy.

The most important piece of data printed on the card is the geographical coordinates that are used by the GPS device to continuously determine the direction and the distance to the destination point. The geographical coordinates of the destination point are contained in the bar-code 1. In a less demanding case, knowing the coordinates is sufficient for the GPS device to locate the destination point. In practice, however, we are prevented from freely following the straight direction to the destination by buildings and obstacles. We have to reach the destination by road so we have to be familiar with the detailed road network in the vicinity of the destination point. For a more advanced way of navigation along traffic routes, the card is completed with detailed information about the road network.

The road network system information on the card is recorded in analog form, and processed by the GPS device according to the invention after electro-optical reading and digitalization. The drawing of the road network is printed in miniature map segments 2 on the card, using fine lines to represent roads. The map segments 2 show the related areas of the destination point in different scales. Each map segment 2 has the destination point in its center.

Figure 3:
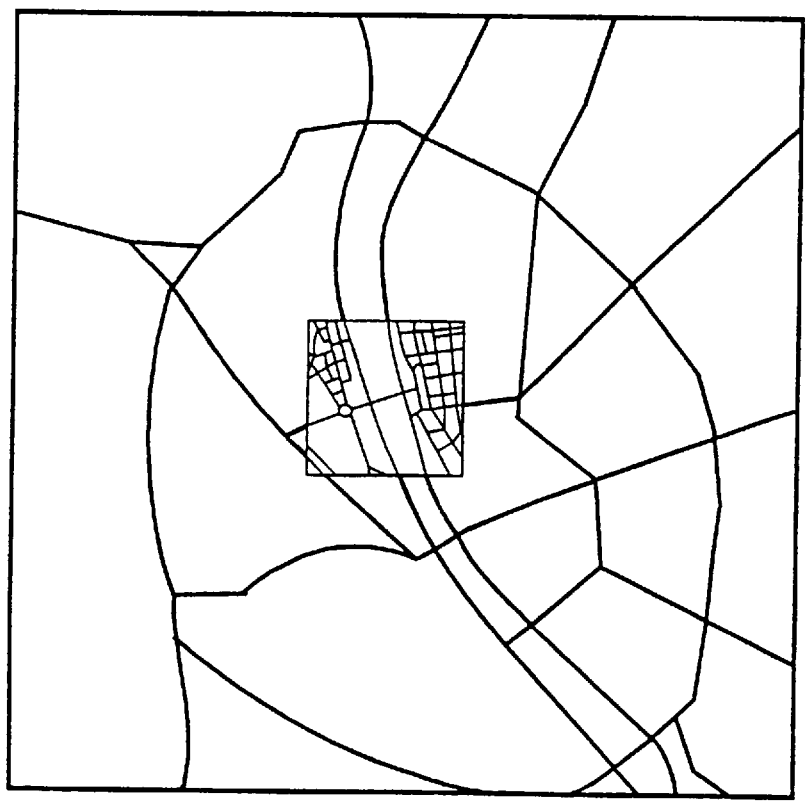
FIG. 3. concentric insertion of map segments

The center point of the map segments 2 corresponds to the coordinates given by the bar-code 1. The map segments 2 of different scale are included in squares of identical size, so each consecutive map segment 2 shows a smaller, but more detailed area. With this solution the maps cover a large area, while upon approaching the destination, the accuracy of the navigation is improving. FIG. 3 shows how the map segments 2 would match if they were of identical scaling.

The miniature map segments 2 printed on the card are in north orientation, their sides aligned with the four points of the compass. On the basis of the orientation, the scale and the coordinates of the center of the map segments 2, the coordinates of any point on the map segments 2 can be computed. The center of the map segments 2 can be determined for instance by the intersection of its diagonals.

The photographs, graphics, and written information placed on the remaining part of the card can be read by the naked eye and by electro-optical sensor, and will provide valuable information on the destination to the user.

Data and information are printed on the surface of the card in an arranged typographical format. This ensures that the card can be included in any printed product. The card can be removed from a printed product along a contour line or perforation and thus inserted into the GPS device.

The map segments 2 on the card can be completed with different colors and/or symbols representing secondary destination points. These preferably would be important service locations, such as gas stations, hotels, parking lots, etc. The device can identify the service providers by the color or shape of symbols, and calculates their coordinates on the basis of their position on the map segment 2. This way, the GPS device can direct the driver to the nearest gas station or to other service providers as the driver wishes.

Figure 4:
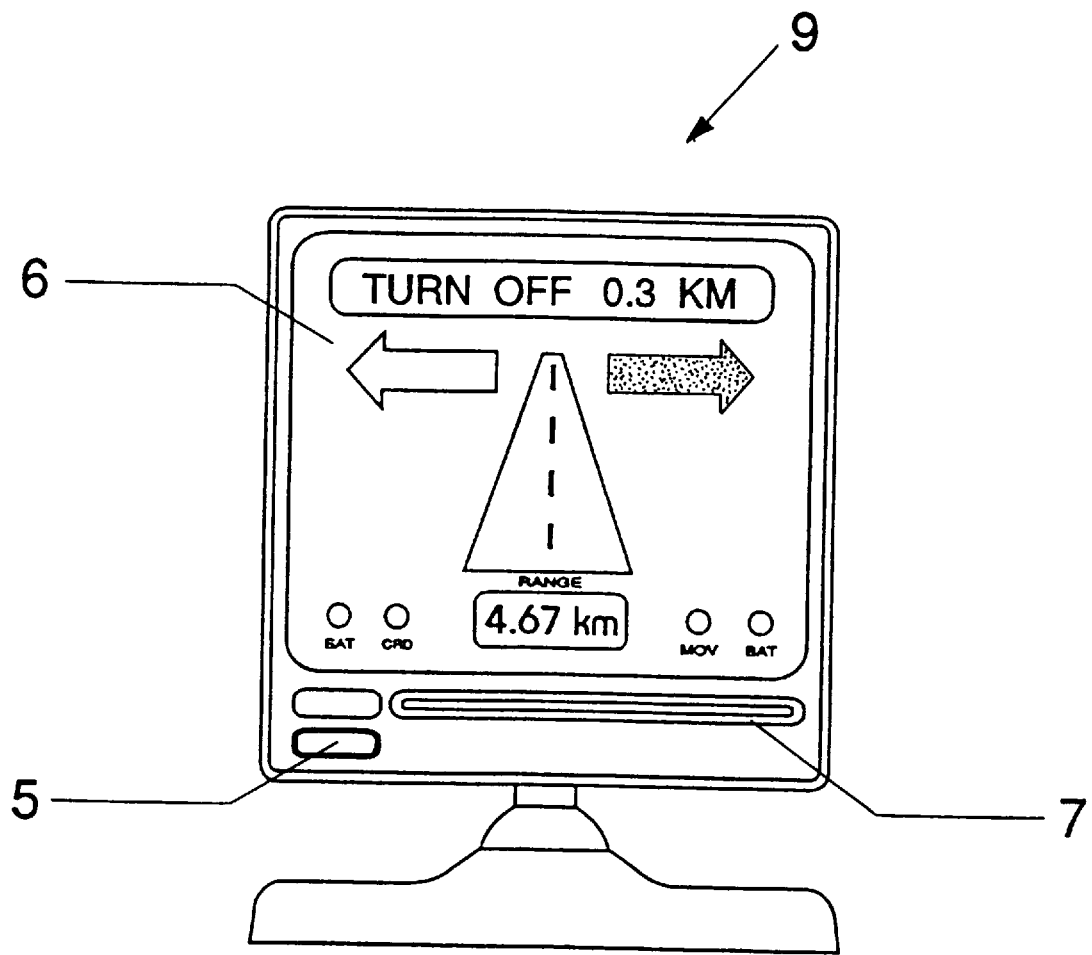
FIG. 4. GPS device, front view

FIG. 4 shows a preferred embodiment of the GPS device combined with the card reader. The device can be turned on by the main switch 5. The card input slot 7 enables the insertion of the card. The display 6, showing various information to the driver is on the front panel of the GPS device. In the FIG. 4 the display 6 is shown in an operating mode, when it displays the distance to the destination and the closest way point distance and the directions. If the driver travels outside the area covered by the map, the GPS device automatically changes operation mode and the display 6 shows the linear distance to the destination and its direction. In this case the direction of the destination point is displayed in an angle relative to the movement of the vehicle.

Figure 5:
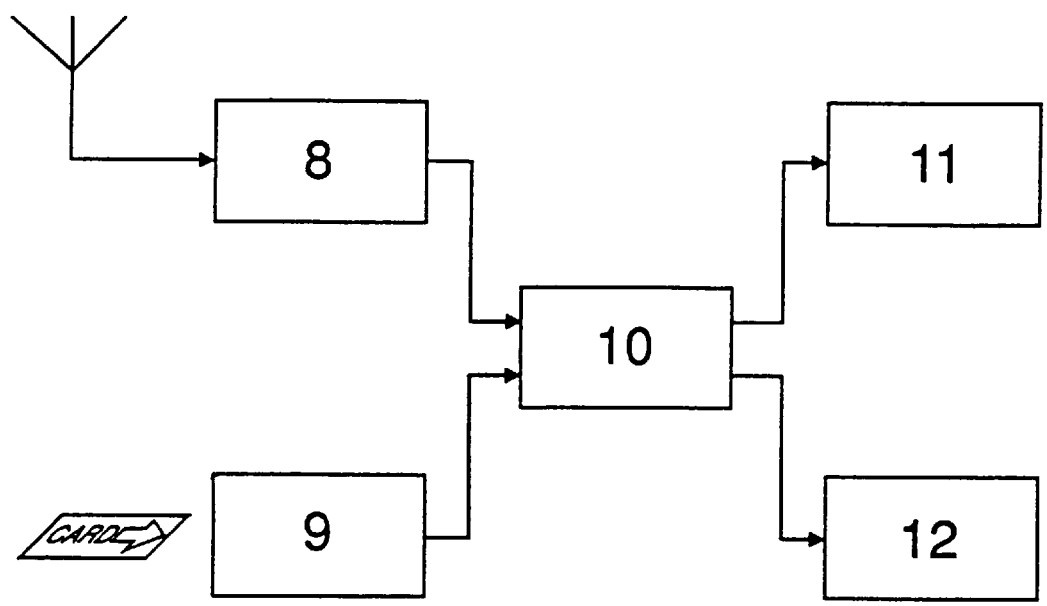
FIG. 5. GPS device, block diagram

FIG. 5 shows the block diagram of the GPS device according to the present invention. The receiver unit 8 receives the satellite signals via the antenna. The data input unit 9 reads the map segments 2 and the bar-code 1 printed on the card. The CPU 10 compares the current position based on satellite signal to the destination position based on the card data and calculates the data needed by the driver. The visual display 11 shows information for the driver. The speech synthesizer—sound signaling unit 12 gives verbal and sound information for the driver.

The CPU 10 determines the real position of the vehicle with reference to the destination coordinates and performs all navigation calculations. The CPU 10 consists of a microprocessor and its functions are controlled by a program stored in the memory of the CPU 10.

The receiver unit 8 receives satellite signals via the antenna. After amplifying and demodulating the radio signals, the receiver unit 8 provides data on the position of the vehicle to the CPU 10. The receiver unit 8, produced in several forms which is an important part of the GPS device. In accordance with the quality category of the GPS device, multiplex or sequential receiver units with a small or large number of channels can be used.

In case of simple GPS device, the data input unit 9 consists of a miniature bar-code reader. This reader can only read the bar-code 1 information printed on the card. The geographical coordinates contained in the bar-code 1 are read into the CPU 10 where they are compared to the actual vehicle position received from the receiver unit 8. On the basis of the two position coordinates, the CPU 10 determines the direction and distance of the destination point, and sends the result to the display unit. The device is also capable of tracking the movements of the vehicle, so the direction of destination is displayed relative to the movement of the vehicle. The visual display 11 shows the computed direction graphically, while the distance to destination is displayed numerically.

Bar-code readers are widespread in both industrial and everyday use, therefore a modified version of the bar-code reader can be easily engineered.

The more sophisticated version of the GPS device includes a miniature electro-optical scanner for data input. The scanner reads both the bar-code 1 and the map segments 2 located adjacent to each other on the card. The scanned bar-code and the map information are transferred to the CPU 10 for processing. On the basis of the central coordinate given by bar-code 1, the scale and orientation of the map segments 2, the coordinates of any point on the map segment 2 can be computed. The positioning of the map segments 2 are done by a square frame surrounding them. Based on the actual coordinates supplied by the receiver unit 8, the CPU 10 can indicate the exact position of the vehicle on the stored digitalized image of the map segment 2, determines the optimal route and designates the proper direction for the driver. The scanner unit can read both picture and text from the card, so it is possible to display the picture on the visual display 11, and the speech synthesizer—sound signaling unit 12 can announce the text.

The structure of scanner required for the GPS device is similar to the manual scanners used with computers, or to the scanners used in fax machines. The scanning unit can slowly pull in the card inserted into the GPS device while scanning the information. Alternatively, a laser-optical reading system can be used to read the card, or a CCD image sensor can also be employed, which can convert the entire printed surface of the card into a digitalized electric image.

The results calculated by the CPU 10 are sent to the display unit. The information presented by the display 6 indicates to the driver the optimum travel direction and the distance to the next turn-off. The GPS device presents the information on the easy-to-interpret visual display 11. Simultaneously with the visual display 11, the speech synthesizer—sound signaling unit 12 provides verbal information and sound signals so that the frekvent watching of the device does not distract the driver's attention.

The display is a variation of the LCD display widely used in electronic equipment and is suitably developed for this purpose. On the display alphanumeric characters and graphic symbols show directions to the driver. Devices intended to fulfill higher needs may be equipped with color LCD matrix displays, similar to those used in pocket color televisions.

The voice synthesizer feature is generally used in electronic devices. In this application the speech-supported signal is designed to provide increased traffic safety.

The universal data input card according to the invention and the card-operated GPS device provides' excellent opportunity to expand GPS technology.

The introduction of card-operated GPS device is ideal for winning the widest target group because the application of a card greatly simplifies the use of the device. With the introduction of the card, the invention opens opportunities that make the use of the GPS device accessible and simple for everyone.

The invention introduces a new concept, namely, the GPS card. The manufacturing of the card is very economical because it is made of paper and prepared solely using normal printing technology. The mass circulation of inexpensively manufactured GPS cards can promote that many people are informed about the existence of card-operated GPS devices, and this may establish the large-scale general use of these devices worldwide.

The invention creates a close compatibility between traditional printed products and the new data input device, exploiting a large number of advantages offered by this possibility.

The design of the card described in this invention makes it possible for newspapers or magazines to print GPS cards in the advertising section, and the card can be cut out with a pair of scissors or can be torn off along perforation from the paper. This will open the way for a new advertising media. The card can be detached from the page and inserted into the GPS device. The advertiser thus makes it possible for the customer to get to his store or premises with the help of the card-operated GPS device.

Business cards, invitation cards, concert tickets, event tickets etc. may be printed in a format that can be inserted in the card-operated GPS device.

It is possible to produce the cards in a collection suitable for circulation in book form where the interests, hotels, restaurants etc. can be published, illustrated with color photos and completed with useful information relevant to a given area.

The design of the card according to the invention could become a standard input device generally accepted for GPS navigational systems.

The structure of the card-operated GPS device according to the invention is exceptionally simple. This is partly due to the fact that the data input device according to the present invention eliminates the use of additional media, since all navigational information are included on the card. Thus the simpler models of the device do not have controls at all.

The driver simply inserts the selected GPS card into the GPS device, whereby the device provides continuous, detailed information for the driver on how to reach the destination point indicated on the card. The card-operated GPS device according to the present invention saves the driver the trouble of obtaining cartographic or navigational knowledge or learning complicated operating techniques.

The combined presence of the aforementioned facts ensures the advantages of the card and the card-operated GPS device according to the present invention, in comparison with previously known data input methods and GPS devices with similar purpose.

Due to the unusual cost effectiveness, self-promoting capabilities, versatility of the card and its many other positive features already discussed, the eventually widely used card-operated GPS device according to the present invention has the potential of creating new habits in daily orientation. The invention is capable of initiating processes that could have a significant effect on the society, moreover, it can create a new line of industry worldwide.

We claim:

1. A data input card for navigation devices to facilitate approaching a predetermined destination point, said card having a top surface, said top surface being divided into at least two distinct fields, the first of said fields being arranged on a predetermined portion of said top surface and comprising a bar code with bars having a predetermined orientation relative to said first field, said bar code representing data related at least to the geographical coordinates of said destination point, and the second of said fields being provided with printed information perceptible to the human eye and relating to one of said destination point and a physical establishment at said destination point.

2. The data input card as claimed in claim 1, wherein said top surface is provided with a third field that comprises a plurality of printed map segments of identical size and orientation perceptible to the human eye, said map segments comprising respective maps with differing scales and comprising said destination point and at least a traffic route leading to said destination point.

3. The data input card as claimed in claim 2, wherein said destination point is located in the center of each of said map segments.

4. The data input card as claimed in claim 2, wherein said card has a rectangular form with two short sides and two long sides, said third field with said map segments is arranged along one of the short sides, said map segments are squares with sides extending parallel to the sides of said card, said first field is in the form of a narrow strip extending parallel to said short side and located near said third field, and the orientation of the bars is parallel to said long sides.

5. The data input card as claimed in claim 1, wherein said printed information on said second field is a picture.

6. The data input card as claimed in claim 1, wherein said bottom surface comprises further printed information associated with one of said destination point and a physical establishment located at said destination point.

7. The data input card as claimed in claim 2, wherein said map segments comprise further destinations marked distinctively from said printed information associated with said destination point.

8. A navigation system for approaching a predetermined destination point operating by using a data input card and having a navigation device for determining the current location, comprising a data input card including at least the data of the geographical coordinates of said destination point in a printed form; a card receiving device having a data input unit for detecting and reading said printed data on the card received; a central processing unit connected to said data input unit to receive said geographical coordinate data of said destination point and to compare said coordinate data with said data of the current location provided by said navigation device, said central processing unit providing information how said destination point can be approached; and a display for displaying predetermined information provided by said central processor unit.

9. The navigation system as claimed in claim 8, wherein said data input card comprises map segments relating to respective predetermined surrounding areas of said destination point, said map segments comprising at least such a portion of the road system that enables reaching said destination point, said data input unit comprises a scanner for reading said map segments, and said central processor unit is provided with a program that enables reaching said destination point along said read out data of the road system.

10. The navigation system as claimed in claim 8, wherein said data input unit comprises a bar code reader.

11. The navigation system as claimed in claim 8, also including a speech synthesizer for generating speech determining the suggested traffic route.

* * * * *